Oct. 6, 1936.  H. R. WHEELER  2,056,875
CONVEYER FOR MOTOR TRUCKS
Filed Oct. 23, 1935  3 Sheets-Sheet 2
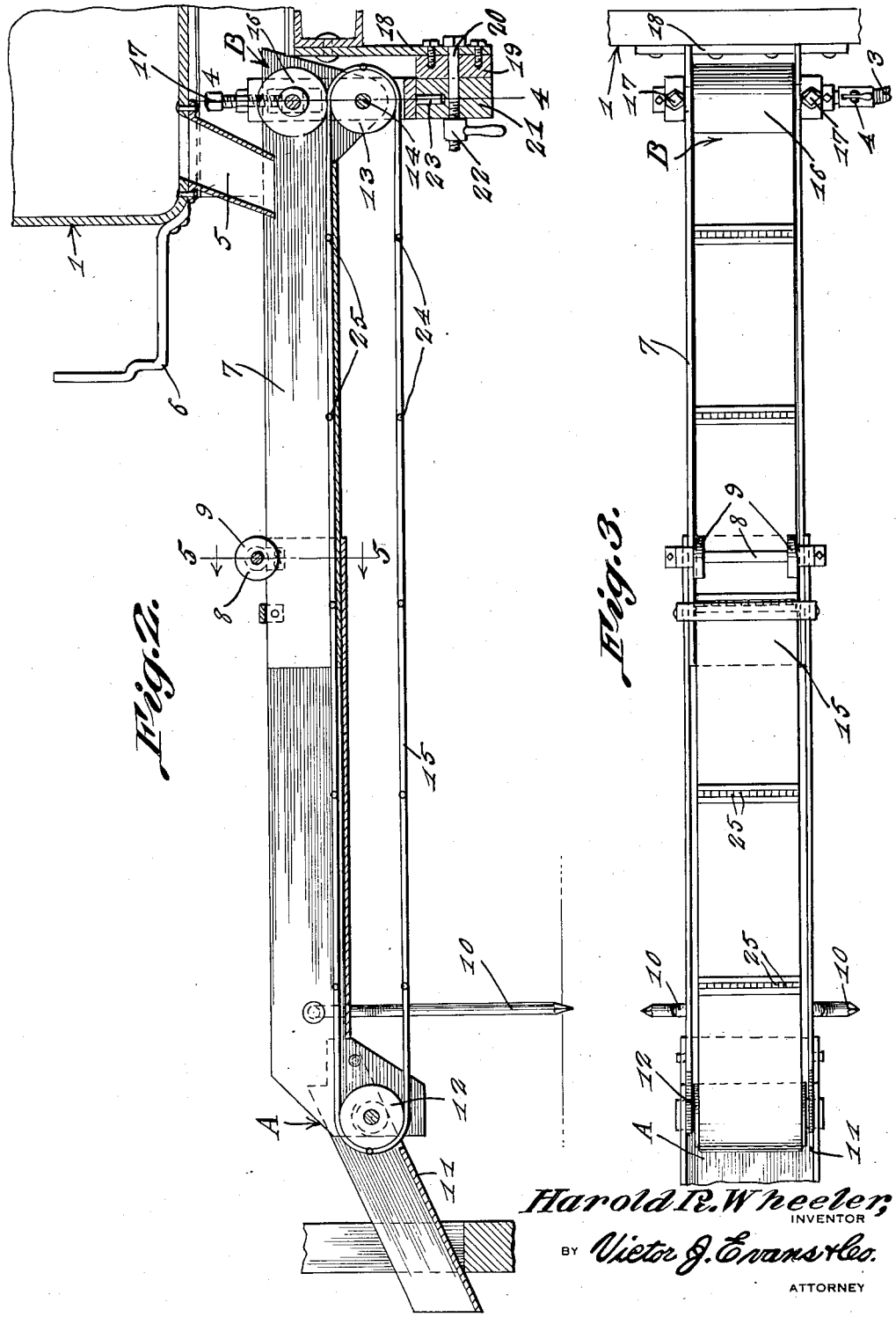

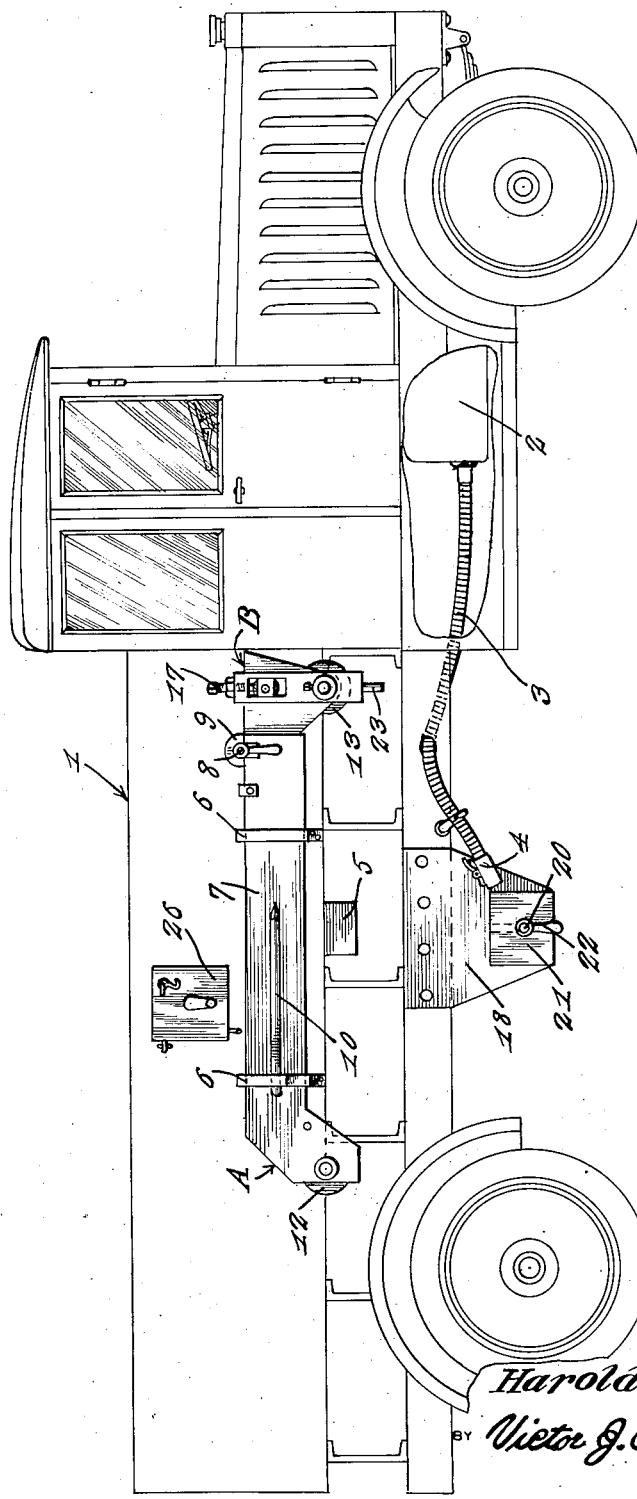

Oct. 6, 1936.   H. R. WHEELER   2,056,875
CONVEYER FOR MOTOR TRUCKS
Filed Oct. 23, 1935   3 Sheets-Sheet 3
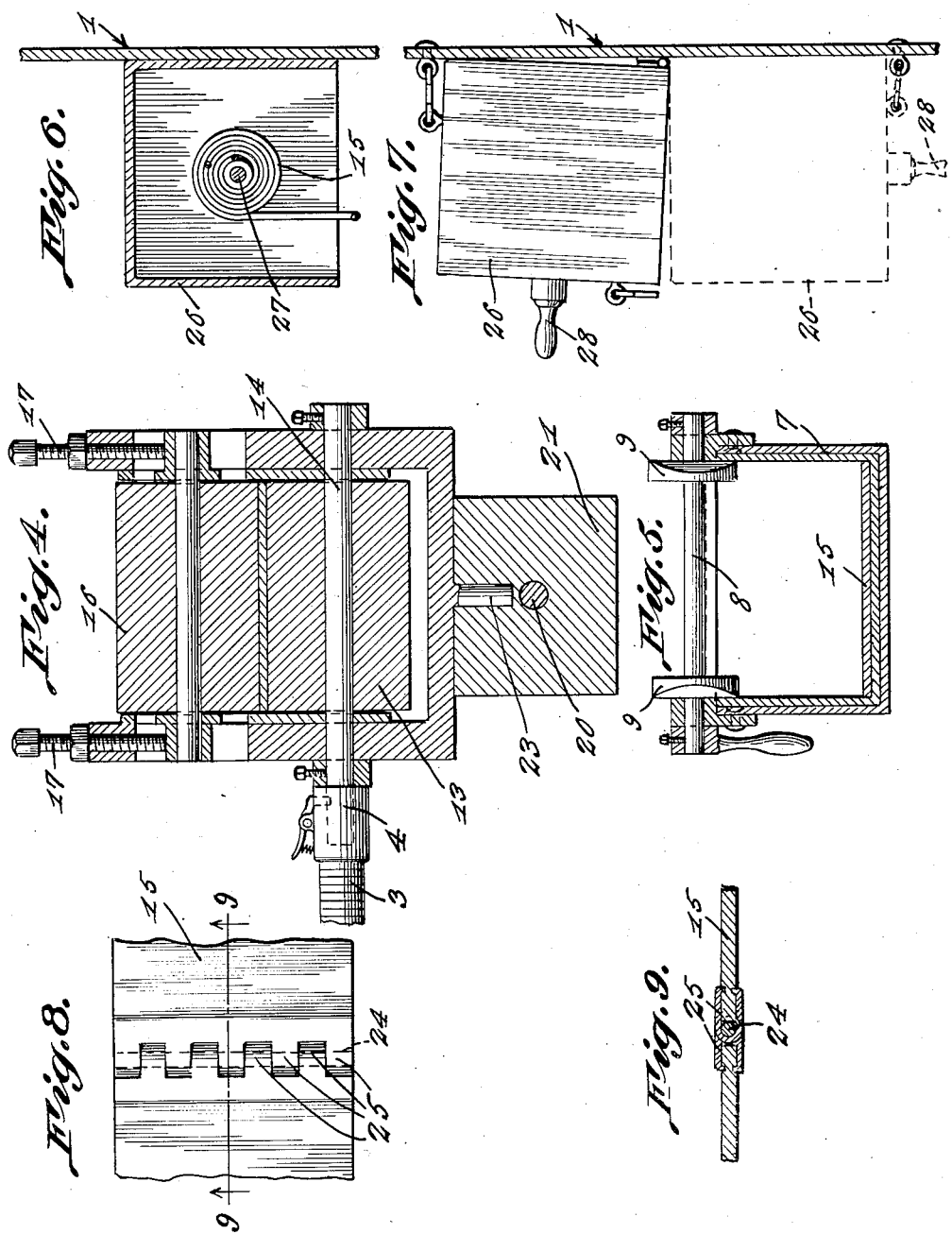
Harold R. Wheeler, INVENTOR
BY Victor J. Evans & Co.
ATTORNEY Patented Oct. 6, 1936

2,056,875

UNITED STATES PATENT OFFICE 2,056,875

CONVEYER FOR MOTOR TRUCKS

Harold R. Wheeler, Harrisburg, Pa.

Application October 23, 1935, Serial No. 46,428

1 Claim. (Cl. 214—83)

This invention relates to conveyers for motor trucks, and has for the primary object the provision of a power driven portable device of the above stated character which is especially adapted for a motor truck for transferring its load to a selected place with ease and quickness and deriving power for its operation from the power takeoff of the truck and which may be readily adjusted as to length and level and may be swung horizontally in either direction relative to the truck so as to meet varying conditions when unloading said truck and may be easily detached from the latter when not in use and carried by means provided on said truck.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a motor truck equipped with a conveyer constructed in accordance with my invention and showing the conveyer in an inoperative position.

Figure 2 is a fragmentary sectional view showing the conveyer in an operative position for conveying the load of a truck to a selected place.

Figure 3 is a fragmentary top plan view showing the conveyer.

Figure 4 is a transverse sectional view taken on the line 4—4 of Figure 2.

Figure 5 is a transverse sectional view taken on the line 5—5 of Figure 2.

Figure 6 is a detail sectional view showing a mounting or casing on the truck for the accommodation of the conveyer belt when not in use.

Figure 7 is a side elevation partly in section showing the several positions occupied by the conveyer belt mounting.

Figure 8 is a fragmentary plan view showing the connection between sections of the conveyer belt.

Figure 9 is a sectional view taken on the line 9—9 of Figure 8.

Referring in detail to the drawings, the numeral 1 indicates a motor truck having a power takeoff 2 including a flexible shaft 3 provided at its free end with a coupler 4. The truck 1 is provided with a side discharge chute 5 for the purpose of emptying the body of the truck of its contents. In order to deliver the discharging contents of the truck to some selected place, my invention is employed and during non-use thereof is supported by a rack 6 located at one side of the truck. The conveyer includes a trough 7 of telescopic sections, as shown in Figure 2, whereby the length of the trough may be varied to meet with different conditions when the truck is being unloaded. Securing means is provided for locking the sections of the trough in their adjusted positions and consists of a shaft 8 journaled to one of the sections and provided with cams 9 to be moved into and out of contact with the other section. The shaft 8 may be rotated in either direction by a suitable handle.

The discharge end of the trough is indicated by the character A and the intake end by the character B. Supporting legs 10 are provided for the discharge end of the trough and may be swung into parallelism with the latter when not in use. Any suitable pivotal connection may be provided between the legs and the trough. Detachably secured to the discharge end A of the trough is an auxiliary chute 11 extending from said trough in a downwardly inclined plane for the purpose of directing materials discharged from the trough to some selected place.

A drum 12 is journaled to the discharge end A of the trough and a drum 13 is journaled to the intake end of the trough. The drum 13 acts as a drive means and includes a shaft 14 to which the coupler 4 of the flexible shaft 3 of the power takeoff 2 may be connected. Operating on the drums 12 and 13 is an endless conveyer belt 15 including a plurality of detachably connected sections whereby the length of the conveyer belt may be varied by adding and taking away sections. The upper run of the conveyer belt passes over the bottom of the trough 7 and the upper run moves in the direction of the discharge end A so that material from the truck falling into the trough by way of the chute 5 will be carried to the chute 11 for delivery by gravitation to the selected place to receive said material.

A tension roller 16 engages the belt where it passes over the drive drum 13. The tension drum 16 is for the purpose of preventing the conveyer belt from slipping and may be adjusted towards and from the drive drum by means 17.

The truck at one side thereof has secured thereto a hanger 18 consisting of a face plate 19 through which extends a bolt 20. Mounted on the bolt 20 is a block 21 and threaded to the bolt is a wing nut 22 whereby the block may be drawn tightly against the face plate 19 when desiring to hold said block stationary. The block 21 is recessed to receive a pin 23 secured to the intake end of the trough 7 thereby mounting the trough to the block 21 for swinging movement in a horizontal plane and in either direction. The block 21 may be turned on the bolt for the purpose of leveling the trough 7 by releasing the nut 22.

The sections of the conveyer belt are detachably connected by pins 24 extending through interfitting staples 25 secured to the sections of the belt.

A mounting 26 is provided on the side of the truck and includes a journal shaft 27 on which the conveyer belt may be wound when not in use and also on which may be kept extra sections to the belt. It is to be understood that when the belt is placed on the shaft of the mounting, the belt is separated at some point therein so that one end of the belt may be placed on the shaft for winding the belt thereon. A handle 28 is provided for the shaft 27 for rotating the latter in either direction.

A device of the character described can be easily adapted to the truck for use and may be readily adjusted as to length besides may be leveled to meet with uneven ground conditions as well as being capable of being swung horizontally in either direction. Further, it will be noted that when in operation the conveyer belt relieves the use of manual power in conveying the load of the truck to the selected place of deposit.

Having described the invention, I claim:

A conveyer for trucks comprising a hanger secured to a truck frame below a discharge of a truck, a face plate secured to the hanger, a horizontally disposed bolt carried by the face plate, a block journaled on the bolt and having a socket, a pin received by the socket, a conveyer means having one end secured to the pin and resting on the block, whereby said conveyer means may be leveled and swung horizontally in either direction, and a nut threaded to the bolt against the block to bind the latter against the face plate for securing the conveyer means in its adjusted position.

HAROLD R. WHEELER.